Aug. 8, 1961 P. A. MAXIMOFF ET AL 2,995,617

SELF-LOCKING TERMINAL

Filed Nov. 3, 1958 3 Sheets-Sheet 1

INVENTORS
ALEX JUST
PAUL A. MAXIMOFF
HAROLD B. KALMAR

BY Byron, Hume, Groen & Clement

ATTYS.

INVENTORS
ALEX JUST
PAUL A. MAXIMOFF
HAROLD B. KALMAR
BY Byron, Hume, Groen & Clement
ATTYS.

SELF-LOCKING TERMINAL

INVENTORS
ALEX JUST
PAUL A. MAXIMOFF
HAROLD B. KALMAR
BY Byron, Hume, Groen & Clement
ATTYS.

United States Patent Office 2,995,617
Patented Aug. 8, 1961

2,995,617

SELF-LOCKING TERMINAL

Alex Just, River Forest, Paul A. Maximoff, West Chicago, and Harold B. Kalmar, Chicago, Ill., assignors to Malco Manufacturing Company, Chicago, Ill., a partnership Filed Nov. 3, 1958, Ser. No. 771,432
9 Claims. (Cl. 174—153)

This invention relates to electrical terminal connectors for insertion in terminal base boards utilized in the electrical and electronics industries. More particularly the invention relates to self-locking terminals and methods and means for effecting efficient, high speed insertion of such terminals by automatic machines.

The particular terminal connector herein disclosed is especially suited to electronic or electrical assemblies utilizing terminal base boards adapted for receiving a plurality of such terminals. In some instances the boards may be formed of electrical conducting material providing electrical connection between all terminals which are not insulated from the board. In other instances the terminals may be secured in insulating base boards, such as a printed circuit board having certain conductive paths provided by conducting material attached to the insulating board in a pattern suited to the particular purpose of the circuit. In both instances separate wiring leads are ultimately connected to the terminals to provide the desired pattern of electrical connections.

One of the necessary requirements of a terminal connector herein disclosed is that it be readily adaptable to automation for dispensing the connector and for mounting it in a terminal base board. Thus, it is important that the terminal be capable of ready insertion, and, in order to save subsequent operations, it is highly desirable that it be permanently affixed to the board after such automatic insertion.

Where terminal connectors were inserted in a conducting base board, it was heretofore necessary to provide at least two different sizes of terminal receiving apertures in the board to accommodate both insulated and non-insulated terminals. The present invention eliminates this requirement and makes it possible to achieve any desired pattern of insulated and non-insulated terminals in base boards having uniform size apertures.

It is an object of the present invention to provide an improved terminal connector which can be used in terminal base boards and the like.

Another object of the invention is to provide a terminal connector which automatically locks itself in a base board upon insertion.

A further object of the invention is to provide an improved self-locking terminal connector which is particularly adapted for insertion by high-speed automatic machinery.

Still another object of the invention is to provide a terminal connector adapted for insulated or non-insulated connection in uniform size apertures in a conducting base board.

An important object of the invention is to provide an improved self-locking terminal.

A still further object of the invention is to provide a terminal connector that is readily and inexpensively manufactured.

A further object of the invention is to provide improved means and methods for inserting self-locking terminal connectors in a terminal base board.

Other objects, features and advantages will be apparent from the following detailed description taken in conjunction with the accompanying drawings, in which.

Figures 1, 2, 3, 4, 5, 6, 7, 8, 9, 10, 11, 20:
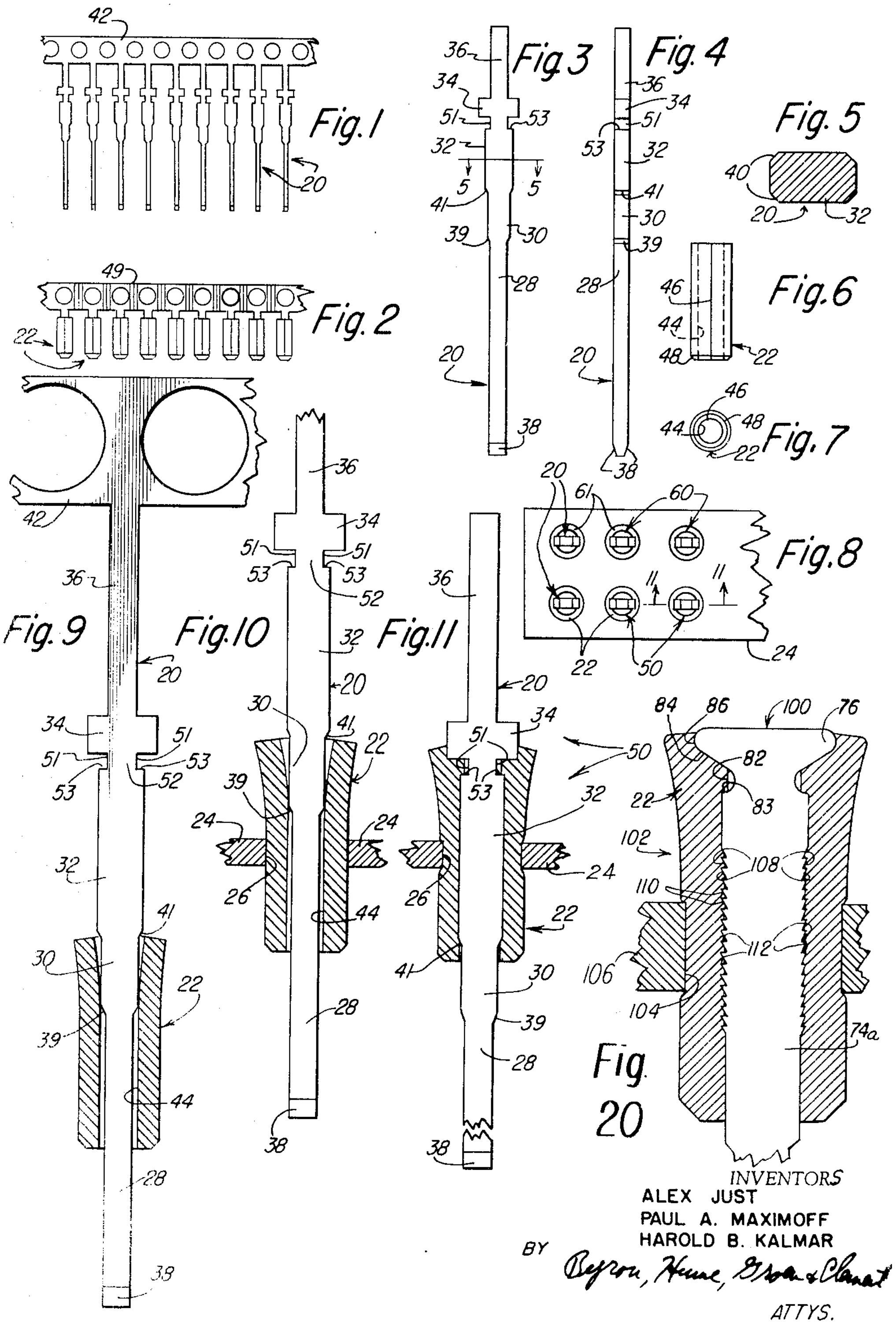
FIGURE 1 is a plan view of a plurality of metallic terminal pins of one embodiment of the present invention, showing the pins secured in chain form for dispensing in automatic machinery.
FIGURE 2 is a plan view of a plurality of metallic terminal sleeves for use with the terminal pins of FIGURE 1, showing the sleeves connected in chain form for dispensing in automatic machinery.
FIGURE 3 is an enlarged plan view of one of the terminal pins of FIGURE 1.
FIGURE 4 is a side view of the terminal pin shown in FIGURE 3.
FIGURE 5 is a further enlarged sectional view taken along line 5—5 of FIGURE 3.
FIGURE 6 is an enlarged longitudinal elevational view of one of the sleeves shown in FIGURE 2.
FIGURE 7 is a top view of the sleeve of FIGURE 6.
FIGURE 8 is a plan view of an electrical terminal base board, showing a plurality of terminal connectors, comprising pins and sleeves according to the previous figures, permanently secured in the board.
FIGURE 9 is an enlarged plan view of one terminal pin of the chain of FIGURE 1 with a terminal sleeve of FIGURE 2, shown in section, temporarily held on the terminal pin in accordance with the first operation of inserting terminal connectors of this invention in a terminal board.
FIGURE 10 is a view similar to FIGURE 9 but showing the second operation after the terminal pin has been severed from the chain and the pin and sleeve have been dropped into temporary position in the terminal board.
FIGURE 11 is an enlarged sectional view taken along line 11—11 of FIGURE 8 and is similar to FIGURES 9 and 10 but showing the third and final operation after the terminal pin has been driven into the sleeve to permanently lock the pin therein and to provide a terminal connector locked in the terminal board.
FIGURE 20 is an enlarged sectional view of another embodiment of a terminal pin used in connection with a sleeve according to one of the first two embodiments to provide a finished terminal connector secured in a terminal board.

Throughout this application the terms "terminal" and "terminal connector" are used to designate a complete connector whether it comprises a single pin or a pin and sleeve combination, while the terms "terminal pin" and "terminal lug" are used to designate a single pin or lug.

The terminal pin or lug of the first two embodiments (FIGURES 1–14) is generally designated by the reference numeral 20. The pin is intended for insertion in a pin-receiving member comprising a sleeve or bushing 22, or 61, to be permanently set in a metallic, electrical conducting terminal board 24 in any one of a plurality of circular apertures or holes 26 of uniform size (FIGURES 10, 11, 13 and 14).

The terminal pin 20 comprises, starting from one end, a lower wire-wrap shank 28, a holding shoulder 30, a gripping shank 32, a head 34, and an upper wire-wrap shank 36, all integral. The pin may be formed, by stamping or the like, from any relatively hard metallic substance having good electrical conducting characteristics, half-hard brass for example, so that the sections of the pin are of uniform thickness.

The wire-wrap shanks 28 and 36 are of rectangular or square cross section with relatively sharp corners about which wiring leads are tightly wrapped (not shown) to form a permanent electrical connection between the leads and the terminal pin 20. The bottom end of the lower wire-wrap shank may be beveled as shown at 38 to provide a lead-in to facilitate handling of the pins by automatic machinery (not shown).

The holding shoulder 30 is provided immediately above the lower wire-wrap shank 28 and is slightly wider in order to provide means for temporarily holding a sleeve 22 in place during assembly, in a manner to be described in detail. The bottom edges of the holding shoulder may be beveled as shown at 39 to facilitate automatic insertion of the pins in the sleeves.

Immediately above the holding shoulder 30 the gripping shank 32 is formed. This shank has a slightly greater width than the holding shoulder and is intended to be gripped within the sleeve 22, or the sleeve 61, after final assembly. The corners of the shank are chamfered at 40, as shown, to facilitate assembly and to prevent the shank from cutting the sleeve, particularly when sleeve 61 of insulating material are utilized in a manner to be described. If the sleeve is cut or scored by sharp edges, it is much more subject to subsequent cracking or splitting. The bottom edges of the shank are beveled at 41 to facilitate automatic insertion of the pins in the sleeves.

The head 34 is formed above the gripping shank 32 and is of substantially greater width than the gripping shank to provide means for limiting the depth of insertion of the pin in the sleeve. The upper wire-wrap shank 36 is provided above the head 34.

The pins 20 are integrally attached in transversely spaced relation to a metallic feed strip 42 (FIGURE 1), so that the pins and the feed strip forming a continuous chain for handling in automatic machinery, such as that shown in the application of Paul A. Maximoff, Stanley J. Krol and John B. Sola, "Lug Inserter," Serial No. 664,-240, filed June 7, 1957, and assigned to the assignee of the present invention.

The sleeves or bushings 22 are of cylindrical configuration and each is provided with an axial aperture or bore 44 which is adapted to receive one of the pins 20. The sleeve is formed of a metallic material having good electrical conducting characteristics, but somewhat softer than the material of the pin, copper for example. The diameter of the bore 44 is only slightly smaller than the width of the gripping shank 32 of the pin, but because the gripping shank is of rectangular configuration, a substantial interference fit is provided causing the sleeve to expand considerably when the gripping shank is driven into the sleeve. To accommodate this considerable expansion, the sleeve is longitudinally split at 46. The bottom edge of the sleeve 22 may be chamfered as shown at 48 in order to provide a lead-in to facilitate insertion of the sleeves in the apertures 26 of the terminal boards 24.

The outside diameter of the sleeve 22 is slightly less than the diameter of the apertures 26 in order to permit ready insertion of the sleeve in the aperture, but the fit is close enough so that the sleeve will become wedged in the aperture when the sleeve is expanded slightly.

The terminal sleeves 22 are integrally attached in transversely spaced relation to a metallic feed strip 49 (FIG. 2) in order that the sleeves may be efficiently handled in automatic machinery (not shown).

The assembly sequence of the first embodiment is illustrated in FIGURES 9–11. In the first operation a predetermined number of sleeves 22 are severed from the flexible strip 49 and are pushed onto the holding shoulders 30 of respective pins 20 in a manner shown in FIGURE 9. The lower wire-wrap shank 28 freely enters the bore 44 of the sleeve, but a slight interference fit is provided between the holding shoulder and the bore, so that the upper portion of the sleeve is spread slightly as shown in FIGURE 9. In the next operation (FIG. 10) the terminal pins with temporarily held sleeves are severed from the feed strip 42 and are dropped into preselected apertures 26 of the terminal board 24. The slight spreading of the upper portion of the sleeves causes the sleeves to drop only about half way into the holes as shown in FIGURE 10, but, if desired, a positive stop may be provided in the machine (not shown) to properly position the sleeves. In the third operation (FIG. 11) each sleeve is held in place, and each of the terminal pins is driven downwardly to force the gripping shank 32 through the bore 44 of the sleeve until the head 34 engages the upper end portion of the sleeve. The pin is driven with sufficient force that the head is partially imbedded in the end of the sleeve, as shown in FIGURE 11. Since there is a substantial interference fit between the gripping shank and the sleeve, the sleeve is spread a considerable amount so that it forcibly grips the surrounding edge portion of the board 24 and flares outwardly above and below the board.

After the third operation has been performed, the pin and sleeve combination form a complete terminal connector, generally designated by the reference numeral 50. The sleeve is permanently secured in the board and an excellent electrical contact is provided between the pin and the sleeve and between the sleeve and the board because of the substantial pressure caused by insertion of the gripping shank and expansion of the sleeve.

It will be understood that all of the operations to be performed in feeding, dispensing and securing the pins and sleeves in the terminal boards are preferably performed in automatic machines such as that of Maximoff et al., Serial No. 664,240, referred to above, but if desired all or some of the operations may be readily performed by hand.

It will be understood that the wire-wrap shanks 28 and 36 are merely examples of types of connecting portions which might be provided. In practice, any type of connecting portion might be utilized for connecting a wiring lead or leads to the terminal connector 50 after it has been permanently secured in the terminal board. Wiring leads may be connected at both ends, as contemplated in this embodiment, or may be connected at one end only.

An important feature of the present invention is the provision of means for automatically locking the terminal pins 20 in place in the sleeves 22. To this end the pin is provided with a pair of locking notches or undercuts 51 immediately below the head 34. The locking notches 51 are provided in the gripping shank 32 on opposite sides thereof, forming a relatively narrow neck 52 having a width in the order of the width of the wire-wrap shanks. When a pin with locking notches is driven into the relatively soft sleeve as shown in FIGURE 11, the material of the sleeve in the vicinity of the notches is forced into the notches to completely or partially fill them. This is due partly to the radial pressure caused by spreading the sleeve and partly to the axial pressure on the upper end of the sleeve caused by penetration of the head. As a result, the lower transverse faces 53 of the locking notches 51, referred to as the "locking faces," engage the material of the sleeve to prevent withdrawal of the pin from the sleeve.

It has been found by test that the pull-out strength of the terminal connector (the force required to pull the terminal from the board or the pin from the sleeve) is approximately doubled by incorporation of the locking notches 51. For example, in a typical installation the pull-out strength without undercut locking notches is about 23 to 25 pounds. When the same terminal is provided with locking notches as shown, pull-out strength is at least 50 pounds, and, in addition, an improved electrical bond is achieved. If desired, the locking notches 51 may be rounded as shown and described in connection with the embodiments of FIGURES 15–19.

If it is desired to insulate the terminal pin 20 from the metallic terminal board 24, an insulating sleeve or bushing 61 (FIGS. 12–14) is substituted for the metallic sleeve 22. The insulating sleeve may be formed of a high-strength, insulating plastic, such as nylon or the like, and the outside diameter of the sleeve may be substantially the same as that of the metallic sleeve 22. In order to enhance the pull-out strength the internal diameter or bore 62 of the nylon sleeve 61 can be made substantially smaller than the corresponding bore of the metallic sleeve, but due to the relative softness and resilience of the nylon the sleeve need not be split.

Figures 12, 13, 14, 18, 19:
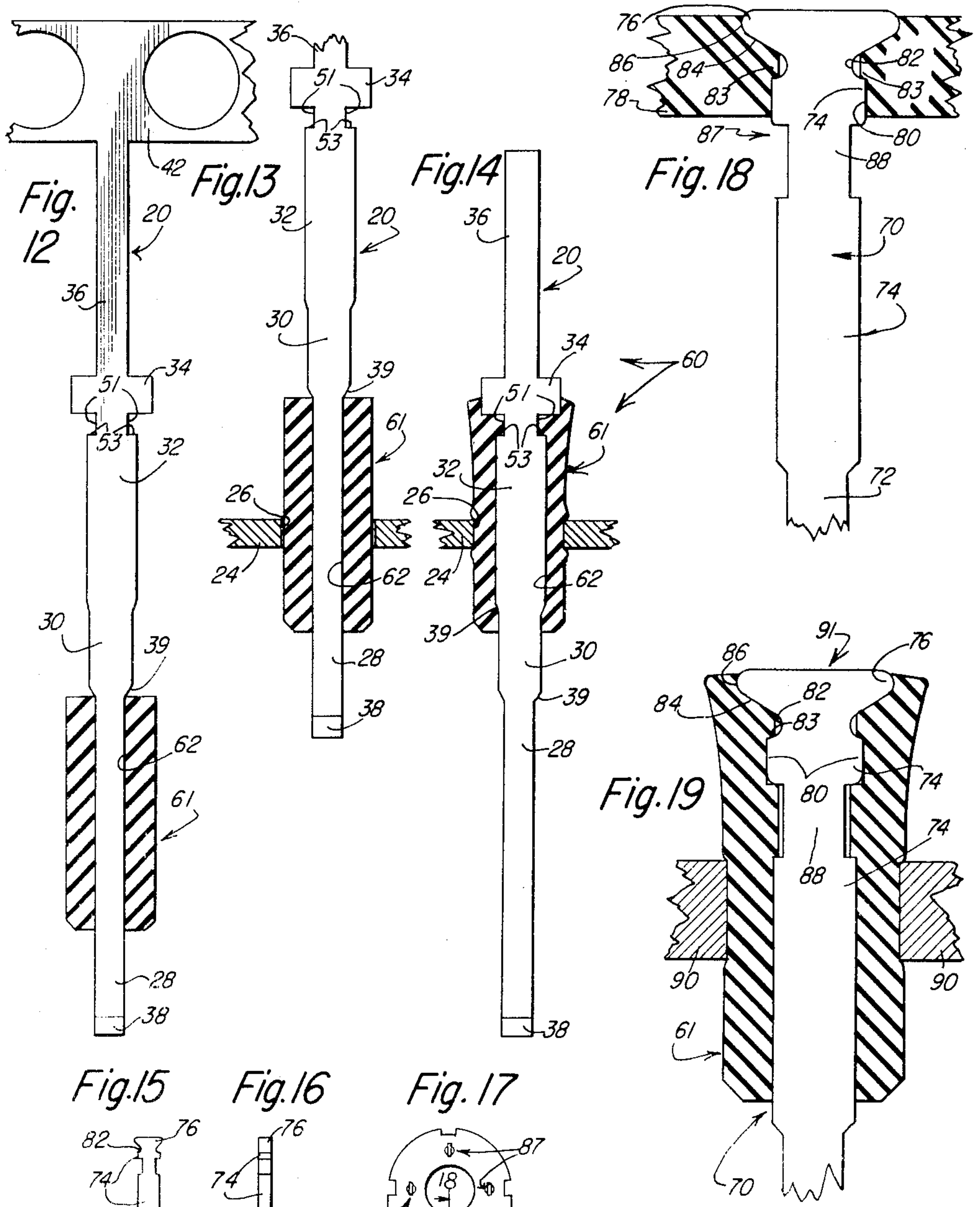
FIGURE 12 is a view similar to FIGURE 9 but showing the first operation in a second embodiment of the invention, using a plastic insulating sleeve rather than a metallic sleeve.
FIGURE 13 is a view similar to FIGURE 12, showing the second operation, which is akin to the operation of FIGURE 10.
FIGURE 14 is a view similar to FIGURES 12 and 13, showing the third operation, which is akin to the operation shown in FIGURE 11, providing an insulated terminal connector permanently secured in the board.
FIGURE 18 is an enlarged sectional view taken along the line 18—18 of FIGURE 17, showing one of the terminal connectors secured in the terminal board.
FIGURE 19 is an enlarged sectional view of a terminal pin according to FIGURES 15 and 16 used in connection with a sleeve according to one of the first two embodiments to provide a finished terminal connector secured in a terminal board.
Figures 15, 16, 17:
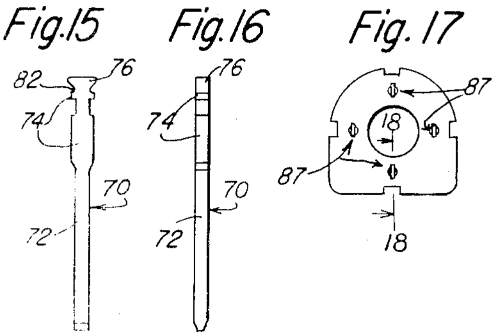
FIGURE 15 is a plan view of another embodiment of a terminal pin according to the present invention.
FIGURE 16 is a side view of the terminal pin of FIGURE 15.
FIGURE 17 is a plan view of a terminal board showing terminal connectors secured therein, comprising terminal pins according to FIGURES 15 and 16 without sleeves as used in the previous embodiments.

In the first operation of securing a pin with insulating bushing 61 (FIG. 12) the bushing is pushed up on the lower wire-wrap shank 28. The bore 62 is sufficiently small that the sleeve will be temporarily held on the lower wire-wrap shank 28 without being pushed up on the holding shoulder 30. In fact, it is desirable that the sleeve stay below the holding shoulder 30 to prevent additional expansion which would make it more difficult to insert the sleeve in one of the apertures 26 of the terminal board 24. The second operation is substantially the same as that of the previous embodiment and is illustrated in FIGURE 13 wherein the sleeve, with a partially inserted terminal pin is dropped into one of the apertures 26 extending about half way into the aperture. In the third operation, shown in FIGURE 14, the sleeve is held in place and the terminal pin is driven downwardly, in substantially the same manner as in the previous embodiment, until the head 34 is imbedded in the upper portion of the sleeve.

After completion of the sequence the combined terminal pin and sleeve form an insulated terminal connector 60. The gripping shank 32 is tightly gripped within the sleeve 61 and the material of the sleeve in the vicinity of the locking notches 51 is forced into the notches and the locking faces 53 engage the material of the sleeve to enhance the pull-out strength. With the softer plastic material the increase in pull-out strength due to the formation of the notches is not as phenomenal but is still important. The sleeve is considerably expanded, as seen in FIGURE 14, so that it is firmly and permanently gripped in the aperture 26 in the terminal board 24, but in this case the terminal pin 20 is insulated from the board by the plastic sleeve 61.

It will be understood that insulated terminals 60 may be interchanged with non-insulated terminals 50 to provide a pattern as shown in FIGURE 8, or any conceivable pattern.

Thus, according to the present invention, it is possible to use the same terminal pin 20 interchangeably with metallic, electrical conducting sleeves 22, or with plastic, non-conducting sleeves 61, in order to insert the pins in either case into uniform size apertures in the terminal board. In this manner, any conceivable pattern of insulated and non-insulated terminal connectors can be provided, and the pattern can be changed at will, without changing the hole pattern in the board, merely by substituting insulating sleeves for metallic sleeves and vice-versa. Formerly, it was necessary to provide larger holes for insulated terminals, since the non-insulated terminals were inserted directly into smaller holes in the board, and when the electrical conducting pattern was to be changed it was necessary to change the hole pattern. It is readily apparent that it is highly desirable to utilize boards with uniform size holes, particularly from an automation standpoint.

It will be understood, of course, that the terminal and sleeve combination of this embodiment may be readily utilized with an insulating board, such as a printed circuit board having patterns of conducting material formed on an insulating base.

A third embodiment of the invention is illustrated in FIGURES 15–18 wherein a terminal pin 70 is shown. The pin of this embodiment is intended for direct insertion into a terminal base board 78 which is formed of insulating material, such as a printed circuit board for example. The pin 70 is quite similar to the pin 20 of the previous embodiment and comprises a wire-wrap shank 72, a gripping shank 74, and a head 76. Inasmuch as the pin is inserted directly into an aperture 80 in the board, without an intermediate sleeve, there is no need to provide a holding shoulder as required in the first embodiment.

In the present embodiment a pair of locking notches or undercuts 82 are formed between the upper end portion of the gripping shank 74 and the head 76, providing respective locking faces 83. The notches are preferably rounded as shown in order to facilitate movement of the material of the board into the notches and to prevent cracking or chipping which would reduce the pull-out strength. This is particularly important when the pin is inserted into a board of relatively brittle material. In order to provide a lead-in for the head, the lower margin thereof is beveled as shown to provide beveled lead-in faces 84, which slant outwardly and away from the notches 82, opposing the respective locking faces 83. A thirty degree bevel may be provided, for example. In addition, the outer margins of the head are rounded at 86.

The terminal pins 70 are also adapted to be fed in chain form (not shown) in an automatic machine such as that of Paul A. Maximoff et al., Serial No. 664,240, referred to above for automatic setting in the pin receiving member, which in this embodiment is the terminal board 78 since there is no intervening sleeve. The pins are driven into the board apertures 80 so that the tops of the heads are almost flush with the upper surfaces of the board, and, when so driven provide finished terminal connectors 87 without terminal sleeves as shown in the first and second embodiments. When the terminal connectors 87 are set in the board, the upper portion of the gripping shank 74 of the pin 70 is tightly gripped in the board aperture. Since the terminal pin is of harder material than the board, the material of the board is forced into the gripping notches 82 as before, so that the locking faces 83 grip the board 78. If the board is formed of fairly brittle insulation material, such as a canvas or linen impregnated with phenolic resin, the lead-ins 84 and the rounded corners 86 of the head prevent chipping or cracking of the board. In addition, the slanted faces and rounded edges permit the material of the board to more readily move into the gripping notches.

If desired, the pin 70 of this embodiment may be provided with a notched wire-wrap portion 88 formed on the gripping shank 74 and so formed that it is positioned immediately below the lower surface of the board after the pin has been set in the board as illustrated in FIGURE 18. To prevent cracking or splitting of the base board, the upper edge of the notch forming the wire-wrap portion is rounded as shown. This permits the attachment of another wire-wrap lead (not shown) about the wire-wrap portion 88, in addition to the lead (not shown) to be attached on the wire-wrap shank 72.

A fourth embodiment of the invention is illustrated in FIGURE 19, showing a terminal pin 70 exactly the same as the previous embodiment but utilizing a terminal sleeve such as the nylon sleeve 61 of FIGURES 12–14. The pin 70 and the nylon sleeve 61 are assembled and inserted in a terminal board 90 (only partly shown) in exactly the same manner as described previously to provide an insulated terminal connector 91. When the terminal connector is set in the board, the material of the sleeve is forced into the locking notches 82, and, in addition, is forced into the notches defined by the wire-wrap portion 88, thus providing an additional locking action. The slanted lead-in faces and the rounded corners of the locking notches and the head enhance the flow of the material of the sleeve into the locking notches 82.

In this embodiment of FIGURE 19, however, it is important that the wire-wrap shank portion 88 be out of alignment with the board 90, as shown. If the wire-wrap portion 88 were aligned with the board 90, the flow of material of the sleeve into the notches would reduce the expansion of the sleeve in that area, which would reduce the pressure exerted by the sleeve against the machine of the board.

It will be understood, of course, that the embodiment of FIGURE 19 may readily utilize a metallic sleeve 22 of the first embodiment. If so, it is desirable to provide a holding shoulder (not shown) below the gripping shank 74 as shown on the terminal pin 20.

In FIGURE 20 a fifth embodiment of the invention is illustrated. In this embodiment a terminal pin 100 is fixedly secured in one of the metallic terminal sleeves 22 to provide a finished terminal connector 102. The terminal connector 102 in turn, is fixedly secured in an aperture 104 of a metallic base board 106. The upper portion of the terminal pin 100 is exactly the same as the upper portion of the terminal pin 70 of FIGURES 15 and 16 and includes rounded locking notches 82. However, this embodiment of terminal pin has a modified gripping shank 74*a*, which has a plurality of sawtooth notches 108 formed on each side edge of the gripping shank. Each of these notches is defined by a downwardly and inwardly slanted face 110 and a locking face 112, which is perpendicular to the shank. The sawtooth notches 108 are considerably shallower than the locking notch 82, but by reason of their number and extent, they provide additional gripping means for gripping the material of the sleeve 22 to help lock the terminal pin 100 in the sleeve. Because of the relative shallowness of the sawtooth notches 108 they do not reduce the expansive force imparted to the sleeve which locks the sleeve in the board aperture 104.

The sixth embodiment of the invention is illustrated in FIGURES 21 to 24, inclusive, in conjunction with a characterization of the steps to be performed in a method for mounting the terminal pin in a base board. In this embodiment, there is shown a terminal pin 120 which is most nearly like the terminal pin 100 shown in FIGURE 20. Specifically, the terminal pin 120 is provided with a wire-wrap shank 122, a gripping shank 124 and a head 126. The wire-wrap shank is as shown in the other embodiments and the head 126 is identical to the head 76 shown in FIGURE 20 and includes the rounded locking notches 82. The gripping shank 124 is modified from that of any of the other embodiments shown in that it is tapered from the locking notches 82 down to the wire-wrap shank 122 in order to provide a wedging action for locking the terminal pin in position. The sleeve 130 shown mounted on the wire-wrap shank of the pin 120 is preferably of insulator material.

Figure 21:
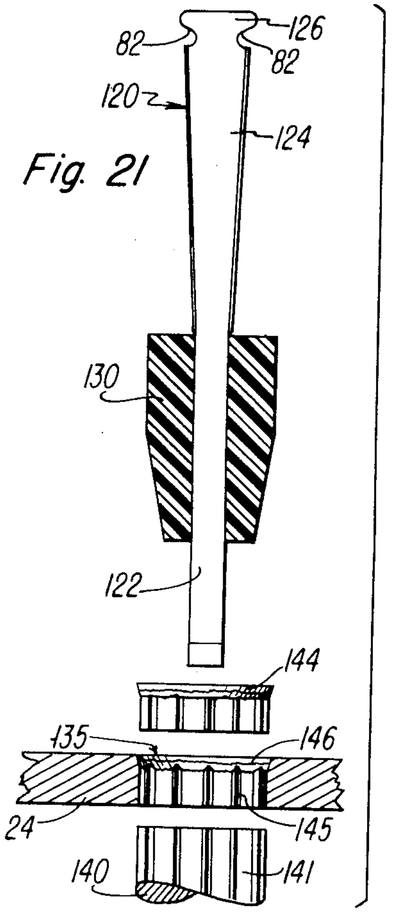
FIGURE 21 illustrates in sectional view another embodiment of a terminal pin and sleeve positioned for mounting in a terminal board and illustrates in schematic form the manner in which the perforation in the base board may be accomplished.
Figure 22:
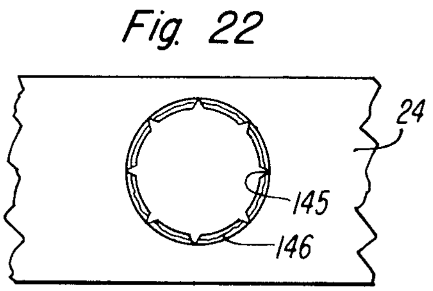
FIGURE 22 is an enlarged plan view of a base board perforated according to the method of FIGURE 21.

FIGURE 21 also illustrates in schematic form the preferred method for mounting the terminal pin in a base board. Therein there is shown a base board 24 of metallic material but which might also be of insulator material in which a terminal pin aperture 135 is illustrated as being made by the punch 140. The punch 140 is shaped to include thereon axially extending ridges 141 and operates on the base board 24 so as to form an aperture including grooves 145 which corresponds at least to a substantial portion of its depth to the surface of the punch 140. The punching operation is completed so that only a portion of the plug forming the aperture is sheared by the die punch and the remainder being broken from the base board. Such broken surfaces are normally conical in shape and are characterized as being irregular with circumferentially extending ridges 146 therein. While the punching operation is shown as being performed by a stroke from bottom to top, it is to be understood that this is merely a schematic representation and is not meant to be a limitation as to the manner in which the punching operation is to be performed.

Figure 23:
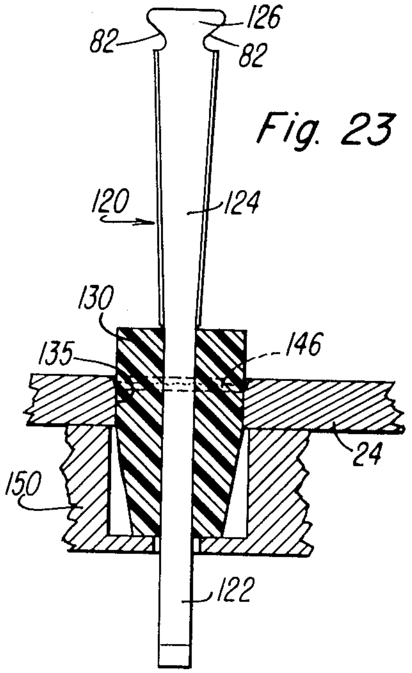
FIGURE 23 is an enlarged sectional view showing the succeeding operation in the method by means of which the terminal pin and sleeve of FIGURE 21 are positioned in the board.

From the foregoing explanations with regards to the other embodiments and the immediately foregoing description, FIGURE 21 characterizes the first steps that are employed in the preferred method for mounting the terminal pin in a board. Specifically, according to the preferred method, the aperture 135 in the base board 24 is formed by utilizing a die punch 140 carrying thereon axially extending ridges 141 and the punching operation is performed so that the aperture so formed includes axially extending serrations or grooves 145 through at least a part of the depth of the aperture and a plurality of circumferential serrations or ridges 146 extending through the remainder of the depth of the aperture. At the time that the aperture is formed, the terminal pin has applied thereto the insulator sleeve 130 which is carried on the wire-wrap shank 122 thereof in a frictional fit. In the next step of the preferred method for mounting the terminal pin, the terminal pin 120 with the insulator sleeve 130 thereon, is introduced into the aperture 135 at its outwardly tapering end so that the outward taper of the aperture and the inward taper of the sleeve 130 both cooperate to permit easy location and positioning of the sleeve 130 and pin 120 in the aperture 135. The sleeve 130 is of a circumferential dimension not larger than the smallest circumerential dimension of the aperture 135 so that the sleeve 130 fits loosely into the aperture. Some form of stop 150 is provided on the bottom side of the base plate 124 against which the lower end of the sleeve 130 may rest so as to position the sleeve 130 in the aperture as shown in FIGURE 23.

Figure 24:
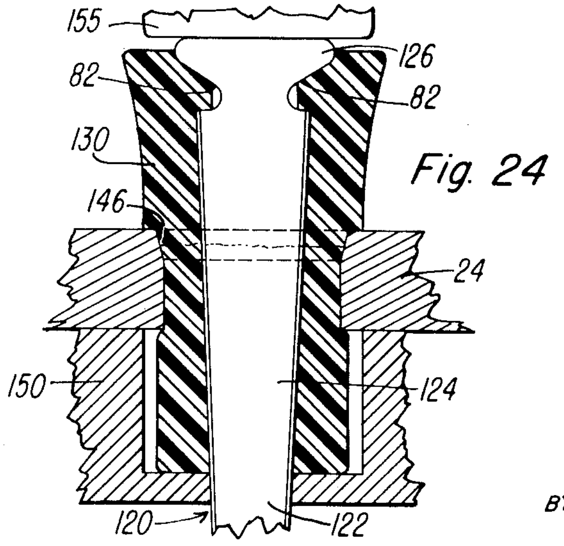
FIGURE 24 illustrates the final step in the method whereby the terminal pin is driven into locked position in the terminal board.

As the next step in the preferred method for mounting the terminal pin in the board, the terminal pin 120, with its sleeve 130 supported by a stop for proper positioning within the hole, is struck by a hammer tool 155 so as to drive the pin into the insulator sleeve 130 thereby expanding the insulator sleeve as shown in FIGURE 24 to completely fill the hole 135 and to overlap the edges of the aperture 135 on both surfaces of the base plate 24. Accordingly, the sleeve 130 is securely locked in the board. The locking grooves 82 in the head 126 thereof also cooperate with the compressed sleeve 130 to prevent easy withdrawal of the pin from the sleeve 130. The tapered sides of the gripping shank 124 cooperate closely with the tapered portion of the aperture 135 to make certain that the expanded edges of the insulator sleeve overlap the edges of the aperture 135 on the upper surface. While it may be thought that the tapered nature of the gripping shank 124 might reduce the pull-out strength of the pin, the locking notches 82 therein cooperate with the insulator sleeve 130 to prevent easy pull-out of the pin from the sleeve and from the base board 24. When so mounted, the outer surface of the insulator sleeve 130 fills the irregularities on the inner surface of the aperture 135 formed by the grooves and ridges 145 and 146 so that the terminal pin and sleeve are locked against any twisting movement and also against any pull-out movement. Accordingly, the shape and surfacing of the inner surface of the aperture 135 contributes greatly to the strength and stability of the terminal pin mounting in the base board.

From the foregoing description it will be seen that the present invention provides an improved terminal connector and methods and means for efficiently and automatically locking such connector in position in a terminal board. Terminals of this invention may be utilized with or without terminal sleeves, either insulating or conducting sleeves, and the pins may be set in conducting or non-conducting terminal base boards. The terminals of this invention are specifically adapted for complete automation in handling and insertion.

While disclosures have been made herein relative to conductive and non-conductive base boards in some applications, it may be desirable to employ metallic terminal boards without regard to their electrical conducting properties and for purposes of achieving a terminal board of greater utility. Specifically, in some instances where it has become practiced to employ insulator boards which are subject to moisture effects, warping, chipping, and breaking, it has proved more satisfactory for both fabricating purposes and for field uses to employ formed metallic boards made, for example, of extruded aluminum or, alternatively, roiled aluminum or rolled steel, wherein the terminal pins are insulated from the metallic board by means of insulator sleeves. Terminal locks so formed are not subject to chipping or cracking during the fabrication process and in use are not subject to influence by moisture or heat and so do not warp or otherwise deteriorate.

Variations and modifications may be effected without departing from the scope of the novel concepts of the present invention.

We claim:

1. A terminal connector for securing in an aperture of predetermined size in a terminal baseboard comprising a terminal sleeve having a passage therethrough and having normal transverse outside dimensions approximately the same as the normal transverse dimensions of said baseboard aperture, a metallic terminal pin having a gripping shank with a maximum transverse dimension having a substantial intereference fit in the transverse dimension of said passage, said gripping shank having a minimum transverse dimension substantially smaller than the transverse dimension of said passage, whereby the outside dimension of the sleeve in the direction of the maximum transverse dimension of the pin is expanded to firmly grip the portion of said terminal board defining said board aperture when said sleeve is inserted in said aperture and said pin is inserted in said sleeve.

2. A terminal connector according to claim 1 wherein said pin is formed of flat metal stock with said gripping shank of generally rectangular cross section.

3. A terminal connector according to claim 1 wherein said sleeve is formed of a dielectric material softer than the material of said pin.

4. A terminal connector according to claim 1 wherein said sleeve is formed of a metallic material softer than the material of said pin.

5. In combination, a terminal baseboard having an aperture of predetermined size therein, a terminal sleeve disposed in said aperture and having normal transverse outside dimensions approximately the same as the transverse dimensions of said aperture, said terminal sleeve having a longitudinal passage therethrough, and a metallic terminal pin having a gripping shank disposed in the passage of said sleeve and an integral connector portion at one end of the pin for connecting to an electrical lead, said gripping shank having a maximum transverse dimension with a substantial interference in the normal transverse dimension of said passage, said gripping shank having a minimum transverse dimension substantially smaller than the transverse dimension of said passage, whereby said sleeve is expanded in the direction of the maximum transverse direction of said gripping shank to engage and grip the portion of said baseboard defining said aperture at two opposite sides thereof.

6. A combination according to claim 5 wherein said pin is formed of flat metal stock with said gripping shank of generally rectangular cross section, whereby said two opposite sides of the baseboard defining said aperture are each gripped in two concentrated areas adjacent the corners of said gripping shank.

7. A combination according to claim 5 wherein said baseboard is formed of a metallic material and said sleeve is formed of a dielectric material softer than the materials of said baseboard and said pin.

8. A combination according to claim 5 wherein said baseboard is formed of a metallic material and said sleeve is formed of a metallic material softer than the materials of said baseboard and said pin.

9. A combination according to claim 5 wherein said baseboard aperture is formed with a profile other than circular to prevent turning of said sleeve in said aperture.

References Cited in the file of this patent

UNITED STATES PATENTS

| | | |
|---|---|---|
| 1,969,529 | Shafer | Aug. 7, 1934 |
| 2,397,283 | Martin | Mar. 26, 1946 |
| 2,457,535 | Diethert | Dec. 28, 1948 |
| 2,465,654 | Millard | Mar. 29, 1949 |
| 2,495,623 | Benander | Jan. 24, 1950 |
| 2,513,305 | Gagnier et al. | July 4, 1950 |
| 2,610,390 | Locke | Sept. 16, 1952 |
| 2,640,903 | Kohring | June 2, 1953 |
| 2,694,249 | Kapp | Nov. 16, 1954 |
| 2,806,080 | Corey | Sept. 10, 1957 |
| 2,816,275 | Hammell | Dec. 10, 1957 |
| 2,848,704 | Obst | Aug. 19, 1958 |
| 2,872,655 | Damon | Feb. 3, 1959 |
| 2,911,460 | Oxley | Nov. 3, 1959 |
| 2,919,300 | Carlson | Dec. 29, 1959 |